US008381981B2

(12) United States Patent
Fowler et al.

(10) Patent No.: US 8,381,981 B2
(45) Date of Patent: Feb. 26, 2013

(54) RADIO FREQUENCY IDENTIFICATION OF LIGHTING FIXTURES

(75) Inventors: David Fowler, Union City, CA (US); Mark Covaro, Sonoma, CA (US)

(73) Assignee: Redwood Systems, Inc., Fremont, CA (US)

( * ) Notice: Subject to any disclaimer, the term of this patent is extended or adjusted under 35 U.S.C. 154(b) by 271 days.

(21) Appl. No.: 12/772,887

(22) Filed: May 3, 2010

(65) Prior Publication Data

US 2011/0266345 A1 Nov. 3, 2011

(51) Int. Cl.
*G06K 7/00* (2006.01)

(52) U.S. Cl. .................................................... 235/439

(58) Field of Classification Search .................. 235/383, 235/385, 492, 439; 340/572.1
See application file for complete search history.

(56) References Cited

U.S. PATENT DOCUMENTS

| | | | | |
|---|---|---|---|---|
| 7,323,991 | B1 * | 1/2008 | Eckert et al. | 340/572.1 |
| 7,388,490 | B2 * | 6/2008 | Freitag et al. | 340/572.1 |
| 7,403,120 | B2 * | 7/2008 | Duron et al. | 340/572.1 |
| 7,605,702 | B2 * | 10/2009 | Uchimura et al. | 340/572.1 |
| 2006/0149126 | A1 * | 7/2006 | Ertas et al. | 600/101 |
| 2007/0121323 | A1 * | 5/2007 | Pawlik et al. | 362/253 |
| 2009/0189767 | A1 | 7/2009 | Primm et al. | 340/572.1 |
| 2010/0237695 | A1 | 9/2010 | Covaro et al. | 307/19 |
| 2011/0199004 | A1 | 8/2011 | Henig et al. | 315/152 |

OTHER PUBLICATIONS

U.S. Appl. No. 13/423,828, filed Mar. 19, 2012, Covaro et al.

* cited by examiner

*Primary Examiner* — Seung Lee
(74) *Attorney, Agent, or Firm* — Brinks Hofer Gilson & Lione

(57) ABSTRACT

A lighting system is disclosed wherein each fixture in the lighting system includes a permanently attached radio frequency identification (RFID) tag. Each fixture also includes either a matching hardwired identification chip or an RFID reader capable of reading the RFID tag. The tags can be used for commissioning the lighting system by reading the tags with a portable reader and assigning or removing fixtures from groups. The tags can also be used for other tasks requiring identification and tracking of specific fixtures.

20 Claims, 2 Drawing Sheets

RADIO FREQUENCY IDENTIFICATION OF LIGHTING FIXTURES

FIELD OF THE INVENTION

One or more embodiments of the present invention relate to lighting systems, methods for tracking fixtures used in lighting systems, and methods for creating functional groups of fixtures in a lighting system.

BACKGROUND

Lighting systems for areal illumination typically comprise (1) a set of "luminaires" (light fixtures comprising mounting hardware and one or more light-emitting elements such as incandescent or fluorescent bulbs or arrays of light-emitting diodes [LEDs]), together with (2) one or more sensor elements (motion sensors, light sensors, and the like), (3) control devices (such as dimmers and switches), and (4) power drivers to set the output light level of each luminaire as a function of sensor outputs and control device settings. Such systems can range in complexity from a single wall switch and bulb to commercial building lighting systems comprising hundreds of luminaires, sensors, and control devices.

A common way to specify, configure, and install such systems requires the use of discrete components, where each of the above elements are purchased separately, and the control logic is implemented by the way the components are connected together using wired or wireless connections. Where convenient, certain elements can be physically grouped. For example, an outdoor security light fixture can have a motion sensor built into the fixture, or a table lamp can have an on/off switch built in. Often, however, such combinations are not used, and each element is separately purchased, installed, and wired together in order to create functional groups.

As the total number of components increases, there can be a need for more sophisticated control systems. These are typically implemented using electronic control systems, which can be implemented using either custom electronics or software running on a more general-purpose control device such as a digital computer. Such systems require a trained engineer to manually connect all devices, describe the system to the control hardware and software, and to define the control functions to be implemented.

The cost of discrete components as well as the cost of installation and programming labor have thus far inhibited wide-spread adoption of sophisticated control systems. There are, nevertheless, obvious cost savings and performance benefits that can be realized by intelligently managing the on-time and on-intensity of each light source within lighting systems. Potential saving in electricity usage can be large, and safety and security can be enhanced. Nevertheless, to be widely adopted, the components need to be inexpensive, the installation should be quick and easy, and all configuration work should be possible within the skill range of an average commercial electrician or that of building maintenance personnel.

In order to reduce installation and commissioning costs as well as the skill level required to implement these tasks, it is possible to automate some of the commissioning steps. For example, co-owned and co-pending U.S. patent application Ser. No. 12/538,806 which is incorporated herein by reference, discloses methods for auto-commissioning a lighting system by using signal sources and sensors built into each fixture to automatically determine proximity of fixtures to each other and to automatically create logical groups. However, whether or not such auto-commissioning is used, in many cases, further refinements must be manually implemented. An example of such manual commissioning is disclosed in co-owned and co-pending U.S. patent application Ser. No. 12/708,460 which is also incorporated herein by reference.

Radio Frequency Identification (RFID) is used in a variety of applications as a means of providing unique identification codes associated with a set of related items. These items may range from products in a store to pallets in a warehouse, persons in a race, pets, racehorses, farm animals, cars passing a tollbooth or entering a parking lot, etc. Typically, individual RFID "tags" are attached to each item where each tag comprises a "chip" encoding digital identification data and an antenna that can communicate wirelessly to an RFID "reader." Most embodiments use "passive" tags, where the power necessary to receive a query and transmit identification data back to the reader is also provided via the wireless connection. Some embodiments use "active" tags which incorporate batteries to provide a higher power signal that can be read from greater distances. RFID systems have been implemented over a wide range of radio frequencies. Common embodiments exist using frequencies near 100 kHz, 10 MHz, and various UHF frequencies (100s of MHz to a few GHz). The choice of frequencies is dictated in part by available radio bands not designated for other applications and in part by the performance needs of particular applications. Each frequency band provides different performance and price characteristics.

SUMMARY OF THE INVENTION

A lighting system is disclosed wherein each fixture in the lighting system includes a permanently attached radio frequency identification (RFID) tag. Each fixture also includes either a matching hardwired identification chip or an RFID reader capable of reading the RFID tag. The tags can be used for commissioning the lighting system by reading the tags with a portable reader and assigning or removing fixtures from groups. The tags can also be used for other tasks requiring identification and tracking of specific fixtures.

DETAILED DESCRIPTION

Before the present invention is described in detail, it is to be understood that unless otherwise indicated this invention is not limited to specific construction materials, electronic components, or the like, as such may vary. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a fixture" includes two or more fixtures; reference to "a sensor" includes two or more sensors, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Embodiments of the present invention can be used with various supersets and subsets of the exemplary components described herein. For concreteness, embodiments of the invention will be described in the context of a commercial building illumination system comprising a set of LED luminaires, but the invention is not limited to the use of LEDs as light sources nor to use in illuminating buildings.

Figure 1:
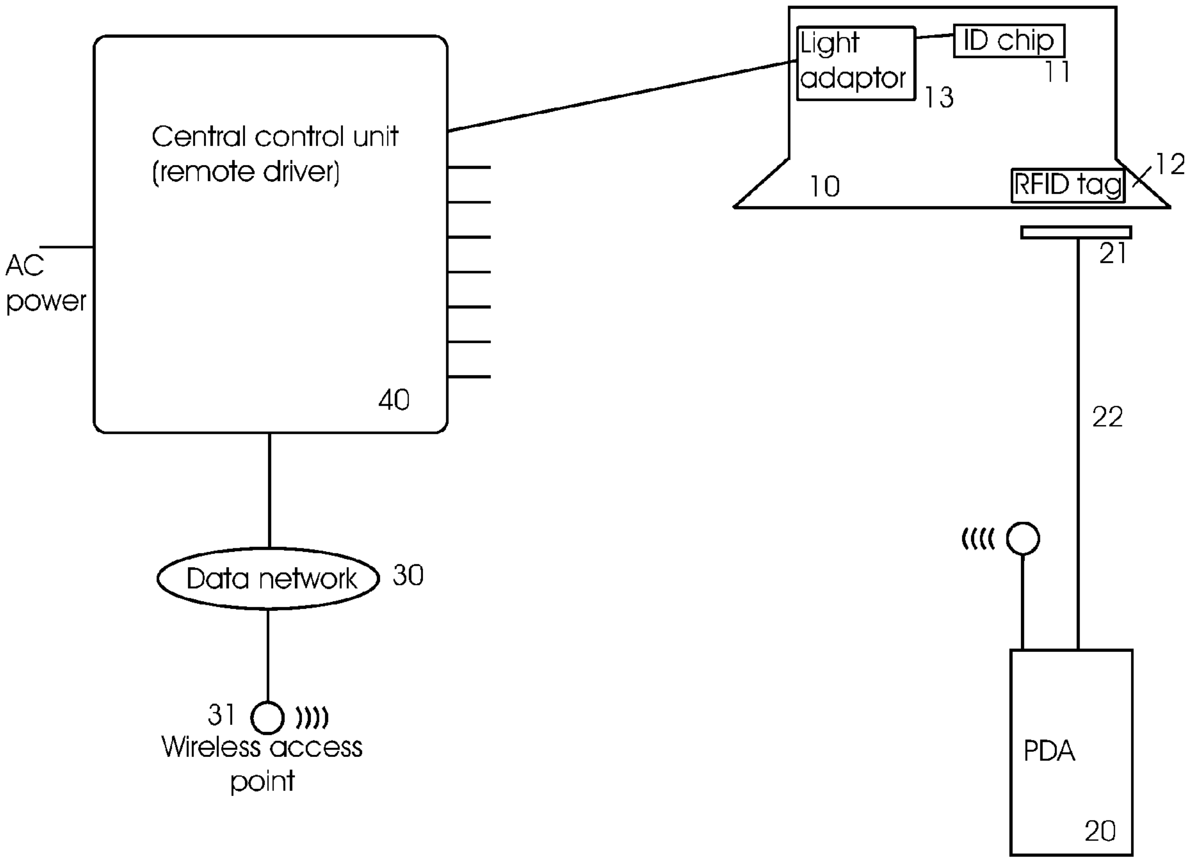
FIG. 1 shows aspects of an embodiment of a lighting system including LED luminaires with RFID tags and a remote driver.

FIG. 1 illustrates a "lighting system" according to one or more embodiments of the present invention. It comprises a set of "fixtures," and at least one central control unit 40 which collects information from sensors and controls and determines the output light level for each light source which may vary from zero to maximum (a non-zero light level that is limited by a maximum sustainable operating point for the light source). The central control unit 40 can further be connected to a data network 30 for communications with other computing devices and additional central control units for expanded capacity. The central control unit also communicates bidirectionally with each fixture in the lighting system.

Certain embodiments, such as those using fluorescent light sources, generally use local "ballasts" that each individually provide power control for one light source, and the central control unit provides a signal to instruct each local ballast to set a particular light level. In other embodiments such as those using LED luminaires 10, the central control unit can also function as a remote driver to provide the power for each luminaire. As used herein, a "remote driver" is "remote" in the sense that it is located at some distance from the luminaires and may provide power for a plurality of luminaires. As used herein, a "fixture" can be a luminaire, or a standalone control or sensor; a "luminaire" is a light fixture including a light source plus suitable mounting hardware and decorative trim. In particular embodiments of the present invention, luminaires can further include light sensors designed to sense light from the light sources of adjacent luminaires (either via direct transmission or via reflection from the area under illumination) and additional signal sources and matching sensors using other wavelengths of light or other signal source/sensor technologies. These sensors and additional signal sources are typically co-located with a "light adaptor" 13 which also includes a microcontroller to enable communications between a fixture and the central control unit.

In accordance with one or more embodiments of the present invention, each luminaire is co-located with at least one sensor and one signal source. The luminaire's light source (for example, a set of LEDs capable of emitting visible white light or a facsimile thereof) can serve as the signal source. As used herein, the term "light source" is to be construed narrowly to encompass sources emitting predominantly visible light unless specifically identified otherwise (as, for example, "infrared light source"). The term "radio frequency" is to be construed herein to describe electromagnetic waves from about 100 kHz to 10 GHz. Such waves do not include infrared, visible, or ultraviolet light.

In certain embodiments, additional signal sources using various technologies such as radio frequency antennas; infrared, ultraviolet, or visible light sources; or ultrasonic emitters can also be provided. Such additional signal sources can provide means for measuring a variety of quantities useful for providing input to a remote driver for a lighting system. Such quantities include motion, daylight, equipment-on status, presence of people, sound and noise, and the like. Sensors capable of receiving signals from the signal source(s) are also provided. For example, if the luminaire light source is the sole signal source provided, then an optical sensor such as a photodiode, phototransistor, or photoresistor built into the luminaire can be used as a suitable sensor. As another example, if an ultrasonic emitter is built into each luminaire or other fixture, then an ultrasonic detector can be built into each fixture to receive and detect the ultrasonic signals emitted by the emitter co-located in the same fixture as the detector as well as those co-located with other fixtures. Further, each luminaire is associated with a microcontroller which serves as a luminaire controller. The microcontroller is capable of transmitting the output of sensors to the remote driver. In certain embodiments, the microcontroller is also capable of controlling one or more of the installed signal sources, although typically it is not capable of directly controlling the power to the luminaire's main light source which is controlled instead by the remote driver. Microcontrollers can be dedicated to single luminaires or shared among two or more fixtures.

In accordance with one or more embodiments of the present invention, each fixture or luminaire is further provided with a radio frequency identification (RFID) tag 12 (see FIG. 1). Any available RFID technology can be used, although the operational performance characteristics and implementation details will vary according to the performance characteristics of the particular RFID technology selected.

Many luminaires' frames are constructed predominantly from sheet metal. Such structures can interfere with the reading of RFID tags in close proximity depending on the proximity spacing and operating frequency. Lower frequency tags (for example, those operating near 100 KHz), which must be detected using very short distances (less than a few centimeters) between tag and reader antenna, are less sensitive to the proximity of conducting surfaces such as sheet metal and may be preferred for that reason. Luminaires that are made predominantly from non-conductive materials such as plastics can be used with higher frequency RFID tags. This can allow the use of larger distances between tag (luminaire) and reader. At certain operating frequencies such as the 10.6 MHz tags commonly used for building access control, it can still be possible to use tags near conducting surfaces as long as the tag can be positioned a short distance away from the conducting surface via a non-conductive standoff. See Examples below for typical spacings and read distances.

One use of RFID technology with lighting systems is to implement the manual commissioning methods disclosed in co-owned and co-pending U.S. patent application Ser. No. 12/708,460. Those methods use a "pointing device" 20 that enables a user to "point" at individual fixtures for the purpose of assigning and removing fixtures from "groups" (see FIG. 1). When each fixture includes an RFID tag 12, then a pointing device can be used which incorporates a matching RFID reader and antenna 21. If the required read distance is short, then the antenna can be mounted at the end of a suitably long adjustable-length pole 22 so that the user can place the antenna within reading distance of the tag in each fixture.

Figure 2:
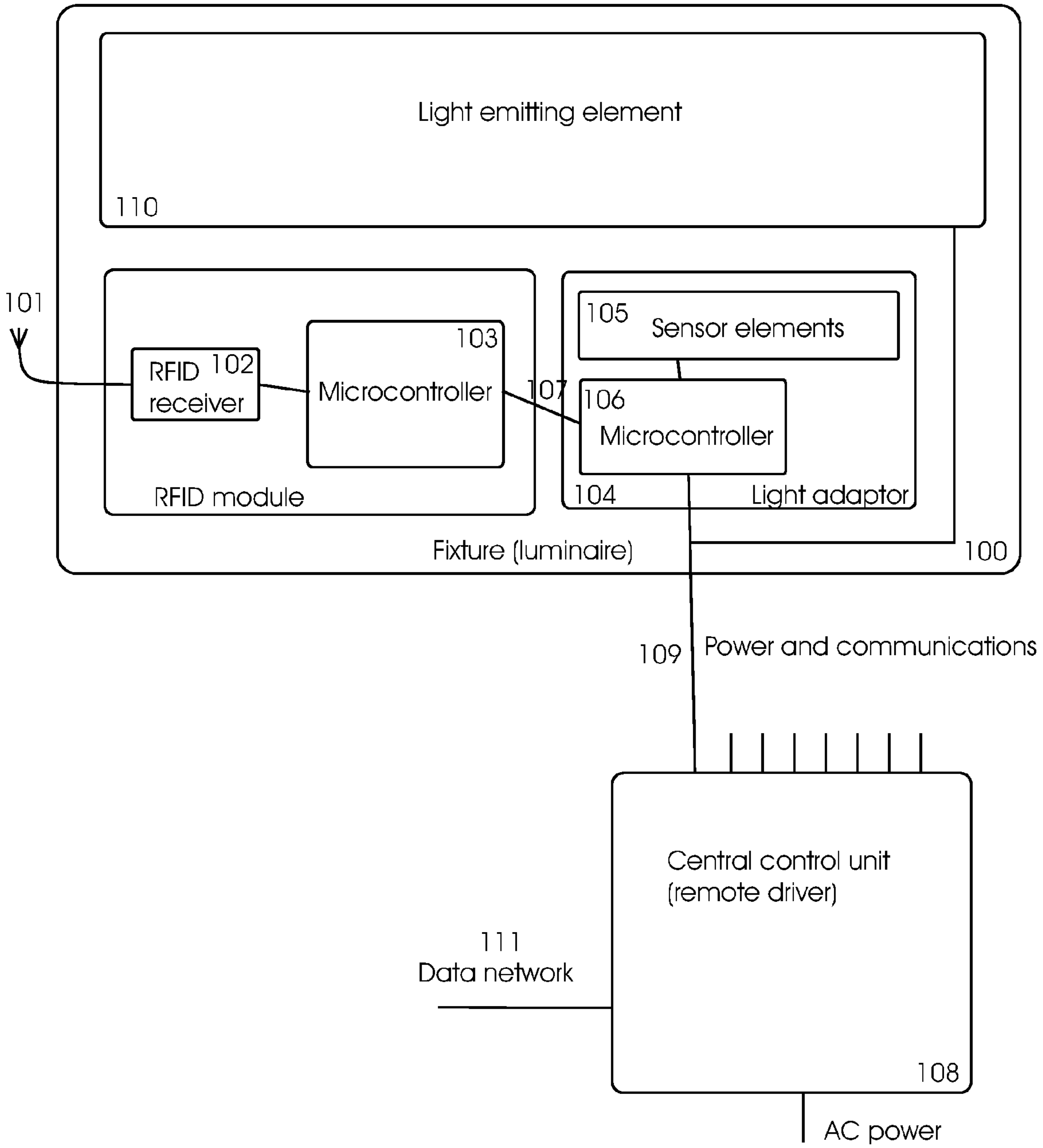
FIG. 2 shows aspects of an embodiment of a lighting system including LED luminaires comprising RFID readers and connected to a remote driver.

It is also possible to invert the geometry, putting RFID readers into each fixture and using RFID tags as a pointing devices (item 12 in FIG. 1 would be an RFID reader, and item 21 would be an RFID tag). This geometry is also illustrated in FIG. 2, where the RFID reader components include a reader antenna 101, a receiver circuit 102, and a microcontroller 103. The RFID reader is co-located with each fixture 100, which is, in this example, a luminaire including a light emitting element 110. Each fixture also includes a "light adaptor" 104 comprising sensors elements 105 and a microcontroller 106. While microcontrollers 103 and 106 are separate elements in these example systems with a communications link 107 between them, these two microcontrollers can also be combined into a single microcontroller. A central control unit 108 can be located remotely. It is linked to a plurality of fixtures to supply power and communications (typically over the same wires 109) to each fixture. There may, in turn, be a plurality of central control units connected together over a data network 111 if the total number of fixtures exceeds the capacity of a single central control unit or distances among fixtures make a plurality of control units desirable.

In this geometry, the RFID tag ID code (now carried by the person performing the manual commissioning task) can be used to identify the person performing the manual commissioning, or alternatively, the person could carry several RFID tags and use a different tag for each group to which fixture assignments are to be made.

While many systems use expensive readers incorporating a lot of functionality, a basic reader need only comprise a suitable antenna and some interface circuitry to allow communication with a computing device. These can be sufficiently inexpensive to build that it is affordable to incorporate a reader into each fixture. Nevertheless, since tags are generally cheaper than readers, if there are no operational advantages to using the inverted geometry, it may be attractive from a cost point of view to put the tags in the fixtures and use a portable reader.

In accordance with one or more embodiments of the present invention, each fixture or luminaire includes an identification chip 11 (see FIG. 1) that can be read directly or indirectly by the microcontroller in the light adaptor 13. The identification chip can be hardwired to the microcontroller. If sufficient data capacity is available, a variety of property data information can be stored including manufacturer, serial number, model number, current rating, voltage rating, power rating, rated lumen output, hours of on-time, group assignment, and any other data that could be useful to maintain associated with the fixture. If the information to be stored does not change with time, the identification chip 11 can be read-only. In certain embodiments variable information such as hours of on-time or group assignment is also stored in the identification chip. Such embodiments require a writeable device. If a fixture includes both an identification chip 11 and an RFID tag 12, then a permanent association between the identification chip and the RFID tag can be made at the factory. This association can be made as an entry into a database accessible to the central control unit 40. Alternatively, the RFID tag ID code can be stored in the identification chip 11 so that no separate database need be created or maintained.

In accordance with one or more embodiments of the present invention, the RFID tag 12 in each fixture also provides the functionality of the identification chip, and no separate identification chip is used. In order for the system controller to be able to read the RFID tag 12 at all times once the fixture is installed and connected to the controller, each fixture in these embodiments includes a simple RFID reader with an antenna located permanently adjacent to the RFID tag 12. (This is not illustrated in FIG. 1, but is approximated by replacing the ID chip 11 with an RFID reader situated so that it can read the RFID tag 12.) Depending on the data capacity of the tag, and whether the tag is read-only or read-write, detailed fixture information can be stored either locally in the tag or remotely in a database. A typical system using 100 kHz read-only tags, with data capacity for an identification code only, would store all other fixture data in a database.

The location of RFID tags and/or receiving antennas within fixtures can vary according to the mechanical design of the fixture. The antennas are typically loops or coils that are typically large compared to the circuit board real estate required for microcontroller and sensor components. It can therefore be a preferred design choice to provide a separate antenna component or components. For assembly convenience, the antenna can be mounted into another fixture component such as a trim ring or diffuser element. LED fixtures, for example typically comprise a plurality of "point" light sources and require a diffuser to spread the light over the area to be illuminated. A flex-circuit loop antenna can be conveniently located around the edge of such a diffuser. Alternatively, the antenna(s) can be similar to the WiFi antenna in a laptop computer and integrated into the fixture.

The RFID tags in the fixtures can be used for any tasks requiring identification of particular fixtures. They can be used in the sales and distribution channels in the same ways that such tags are routinely used for such purposes: inventory control in warehousing and shipping, point-of-sale product identification, etc. Because the tags are attached to the fixtures themselves and not to external packaging (boxes, pallets, bags, and the like), the fixture identification is not lost when the fixture is removed from the packaging. Handheld or stationary readers can be used at any stage from manufacturing to post-installation and even ultimate disposal or recycling to verify the identity of the fixture and check its associated property data. For example, the lighting plot plan for a new installation typically specifies specific fixtures or at least fixture types to be installed at particular locations on a floor plan. The installer can scan each fixture with a reader to verify that it is the correct fixture or fixture type to be installed at the next location. An inspector can similarly verify that the installation conforms to the approved plan. If the RFID tag is capable of storing data in addition to a fixed identification number, then such data can be used to record relevant history such as installation date, commissioning details (group assignments, dates), usage hours, operating levels, sensor data, etc. At the end of fixture life, the RFID tag can be further used to assist in proper de-installation followed by subsequent recycling and/or disposal. For example, the tag can be scanned at any point during transfer, sorting, and ultimate disposition to ensure that each fixture is processed correctly and at the correct location for recycling and/or disposal.

Once fixtures are installed and connected to a system controller, they can be assigned to groups by a "commissioning" process. Any suitable method described in co-owned and co-pending U.S. patent application Ser. No. 12/708,460 can be used. For example, a pointing device comprising a handheld computing device such as a personal digital assistant (PDA) with an attached RFID reader antenna at the top of a pole (optionally telescoping) can be used. Any similar computing device such as a laptop computer, tablet computer, or cell phone with computing capabilities can also be used. The handheld computing device can store all commissioning information for later upload to the system controller, or it can communicate wirelessly with a wireless access point connected to the system controller. The handheld computing device can have a menu driven touch screen which allows the user to read the RFID tag in the luminaire and then associate that luminaire with a group of peripherals (luminaires, switches, sensors). It is also possible to remove the luminaire from a group to which it was previously assigned.

EXAMPLES

Prototype systems were built using RFID evaluation kits sold by Texas Instruments: the TRF7960evm kit operating at 13.56 MHz and the TMS27157 kit operating at 134.2 kHz. Systems using these evaluation kits can be configured as illustrated in FIG. 2.

Example 1

For the 134.2 kHz system, the RFID tags comprised passive transceiver chips attached to 12 mm diameter coils of magnet wire. The reader antenna was a 38 mm diameter coil of magnet wire. If the reader antenna was mounted well away from any metal surface, the tag detection range ranged from about 38-50 mm depending on the relative angular orientation of the planes of the tag coil and receiver coil (shortest range when the two coils were perpendicular, longest range when parallel). With the reader antenna coil mounted 2 mm above a metal surface, the detection range was reduced to 25-38 mm.

Example 2

For the 13.56 MHz system, the RFID tags comprised passive transceiver chips attached to foil loop antennas (single loop). Various RFID tags were tested with antenna loop sizes from 25×38 mm to 50×75 mm. The reader antenna was a single loop on the microcontroller circuit board approximately 50×75 mm in size. If the reader antenna was mounted well away from any metal surface, the tag detection range ranged from about 50-90 mm depending on the size of the tag loop antenna. With the reader antenna loop mounted 2 mm above a metal surface, the detection range was reduced to about 20 mm for all tags.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A lighting system comprising:

a plurality of fixtures comprising luminaires, wherein a respective radio frequency identification (RFID) device is attached to each of the fixtures prior to installation of the fixtures in the lighting system; and a central control unit that receives an identification of each of the fixtures from the respective RFID device over wires that electrically couple the central control unit to the fixtures, wherein the central control unit identifies the fixtures that are electrically coupled to the central control unit based on the identification of each of the fixtures received from the respective RFID device over the wires that electrically couple the central control unit to the fixtures.

2. The lighting system of claim 1, wherein the respective RFID device comprises a tag, and wherein a respective RFID reader co-located with each of the fixtures reads the tag.

3. The lighting system of claim 2, wherein each of the fixtures comprises the tag and the respective RFID reader, and wherein the respective RFID reader reads the identification of each of the fixtures from the tag and communicates the identification of each of the fixtures to the central control unit over the wires that electrically couple the central control unit to the fixtures.

4. The lighting system of claim 3, wherein the tag stores a serial number, a model number, and at least one number characterizing a performance specification for each of the fixtures.

5. The lighting system of claim 1, wherein the respective RFID device attached to each of fixtures comprises a respective RFID reader.

6. The lighting system of claim 5, further comprising an RFID tag placed within a reading distance of the RFID reader, wherein the RFID reader reads the RFID tag when the RFID tag is within the reading distance of the RFID reader.

7. The lighting system of claim 6, wherein said RFID tag is connected to a portable computing device that communicates with said central control unit.

8. The lighting system of claim 1, wherein each of the fixtures further comprises a hardwired identification chip that stores information read from the hardwired identification chip by a processor at each of the fixtures, wherein the information is transmitted by the processor to the central control unit over the wires that electrically couple the central control unit to the fixtures.

9. The lighting system of claim 8, wherein the information comprises at least one of a serial number, a model number, or a number characterizing a performance specification for each of the fixtures.

10. The lighting system of claim 1, wherein a serial number, a model number, and at least one number characterizing a performance specification for each of the fixtures are stored in a database accessible by the central control unit, and are associated in the database with the identification of each of the fixtures received from the respective RFID device.

11. The lighting system of claim 1, wherein said central control unit further comprises a remote driver that sets output levels for the luminaires.

12. The lighting system of claim 1, wherein said luminaires comprise light-emitting diode light sources.

13. The lighting system of claim 1, wherein the respective RFID device that is attached to each of the luminaires includes a respective antenna coupled to each of the luminaires.

14. The lighting system of claim 13, wherein the respective antenna is located around an edge of a diffuser of each of the luminaires.

15. A method of identifying fixtures, the method comprising:

attaching a corresponding radio frequency identification (RFID) device to each one of a plurality of luminaires prior to installing the luminaires in a lighting system;

installing the luminaires in the lighting system;

receiving an identification of each of the luminaires at a central control unit from the corresponding RFID device attached to each of the luminaires, wherein the identification of each of the luminaires is received by the central control unit over wires that electrically couple the central control unit to the luminaires; and identifying, with the central control unit, the luminaires that are electrically coupled to the central control unit from the identification of each of the luminaires received from the corresponding RFID device over the wires that electrically couple the central control unit to the luminaires.

16. The method of claim 15 further comprising:

adding one of the luminaires to a group of the luminaires when a portable RFID reader reads an identification code from a RFID tag in the respective RFID device attached to the one of the luminaires, and the one of the luminaires is not assigned to the group, and removing the one of the luminaires from the group of the luminaires when the portable RFID reader reads the identification code from the RFID tag in the respective RFID device attached to the one of the luminaires, and the one of the luminaires is assigned to the group.

17. The method of claim 15 further comprising verifying that a correct luminaire model is installed in a location by comparing a lighting plot plan with an identity of a luminaire that is read by a handheld reader from the corresponding RFID device for the luminaire.

18. An apparatus comprising:

a central control unit configured to couple to a plurality of luminaires that each includes a respective radio frequency identification (RFID) device, wherein the central control unit is further configured to receive an identification of each the luminaires from the respective RFID device over wires that electrically couple the central control unit to the luminaires, and wherein the central control unit is further configured to identify the luminaires that are electrically coupled to the central control unit based on the identification of each of the luminaires received from the respective RFID device over the wires that electrically couple the central control unit to the luminaires.

19. The apparatus of claim 18, wherein the central control unit is further configured to control the fixtures as a group based on identification information, which is read by a handheld RFID reader from the respective RFID device included in each of the fixtures, corresponding to the identification of each of the luminaires that is received from the respective RFID device over the wires that electrically couple the central control unit to the luminaires.

20. An adaptor in a lighting system comprising:

a radio frequency identification (RFID) reader configured to read identification information from a RFID tag attached to a luminaire that is installed together with the adaptor in the lighting system; and a processor configured to communicate the identification information to a central control unit over wires that electrically couple the adaptor and the luminaire to the central control unit, wherein the central control unit identifies the luminaire that is coupled to the central control unit based on the identification information that is read from the RFID tag attached to the luminaire and communicated to the central control unit over the wires that electrically couple the adaptor and the luminaire to the central control unit.

* * * * *